US011163657B2

(12) United States Patent
Kamran et al.

(10) Patent No.: US 11,163,657 B2
(45) Date of Patent: Nov. 2, 2021

(54) METHOD AND APPARATUS FOR AVOIDING REDUNDANT DATA RECOVERY

(71) Applicant: EMC IP Holding Company LLC, Hopkinton, MA (US)

(72) Inventors: Lior Kamran, Rishon LeZion (IL); Alex Soukhman, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 16/790,305

(22) Filed: Feb. 13, 2020

(65) Prior Publication Data
US 2021/0255940 A1    Aug. 19, 2021

(51) Int. Cl.
*G06F 11/20* (2006.01)
*G06F 12/0804* (2016.01)

(52) U.S. Cl.
CPC ...... *G06F 11/2094* (2013.01); *G06F 12/0804* (2013.01); *G06F 2201/82* (2013.01); *G06F 2212/1032* (2013.01)

(58) Field of Classification Search
CPC ............. G06F 11/1076; G06F 11/2094; G06F 12/0804; G06F 2201/82; G06F 2212/1032
USPC ........................................ 714/6.2, 6.22, 6.24
See application file for complete search history.

(56) References Cited

U.S. PATENT DOCUMENTS

| | | | | |
|---|---|---|---|---|
| 2004/0230742 A1* | 11/2004 | Ikeuchi | ................. | G06F 3/0689 711/112 |
| 2005/0240854 A1* | 10/2005 | Nakagawa | .......... | G06F 11/1084 714/758 |
| 2009/0327801 A1* | 12/2009 | Maeda | ................ | G06F 11/1092 714/6.11 |
| 2016/0217040 A1* | 7/2016 | Jin | .......................... | G06F 3/064 |
| 2018/0203765 A1* | 7/2018 | Critchley | .............. | G06F 3/0689 |
| 2019/0220372 A1* | 7/2019 | Kang | .................. | G06F 12/0246 |

FOREIGN PATENT DOCUMENTS

CN    108228084 A  *  6/2018  .......... G06F 11/2094

* cited by examiner

*Primary Examiner* — Chae M Ko
(74) *Attorney, Agent, or Firm* — Daly, Crowley, Mofford & Durkee, LLLP

(57) ABSTRACT

A method for use in a storage system, comprising: detecting that at least one storage device in a redundant storage device array has failed, the redundant storage device array including a plurality of storage devices; storing, in a memory, a recovery cache containing recovered data blocks, the recovered data blocks containing data previously stored on the failed storage device that has been calculated as part of executing read commands before the redundant storage device array is rebuilt; receiving an I/O command that is associated with the redundant storage device array, the I/O command including one of a read command or a write command; and executing the I/O command by using the recovery cache, wherein the redundant storage device array includes a plurality of storage regions, wherein any of the storage regions includes a respective portion of each of the plurality of storage devices.

14 Claims, 8 Drawing Sheets

METHOD AND APPARATUS FOR AVOIDING REDUNDANT DATA RECOVERY

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

According to aspects of the disclosure, a method is provided for use in a storage system, comprising: detecting that at least one storage device in a redundant storage device array has failed, the redundant storage device array including a plurality of storage devices; storing, in a memory, a recovery cache containing recovered data blocks, the recovered data blocks containing data previously stored on the failed storage device that has been calculated as part of executing read commands before the redundant storage device array is rebuilt; receiving an I/O command that is associated with the redundant storage device array, the I/O command including one of a read command or a write command; and executing the I/O command by using the recovery cache, wherein the redundant storage device array includes a plurality of storage regions, wherein any of the storage regions includes a respective portion of each of the plurality of storage devices.

According to aspects of the disclosure, a system is provided, comprising: at least one processor that is configured to perform the operations of: detecting that at least one storage device in a redundant storage device array has failed, the redundant storage device array including a plurality of storage devices; storing, in a memory, a recovery cache containing recovered data blocks, the recovered data blocks containing data previously stored on the failed storage device that has been calculated as part of executing read commands before the redundant storage device array is rebuilt; receiving an I/O command that is associated with the redundant storage device array, the I/O command including one of a read command or a write command; and executing the I/O command by using the recovery cache, wherein the redundant storage device array includes a plurality of storage regions, wherein any of the storage regions includes a respective portion of each of the plurality of storage devices.

According to aspects of the disclosure, a non-transitory computer-readable storage medium is provided that stores one or more processor-executable instructions, which, when executed by at least one processor of a storage system, cause the at least one processor to perform the operations of detecting that at least one storage device in a redundant storage device array has failed, the redundant storage device array including a plurality of storage devices; storing, in a memory, a recovery cache containing recovered data blocks, the recovered data blocks containing data previously stored on the failed storage device that has been calculated as part of executing read commands before the redundant storage device array is rebuilt; receiving an I/O command that is associated with the redundant storage device array, the I/O command including one of a read command or a write command; and executing the I/O command by using the recovery cache, wherein the redundant storage device array includes a plurality of storage regions, wherein any of the storage regions includes a respective portion of each of the plurality of storage devices.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
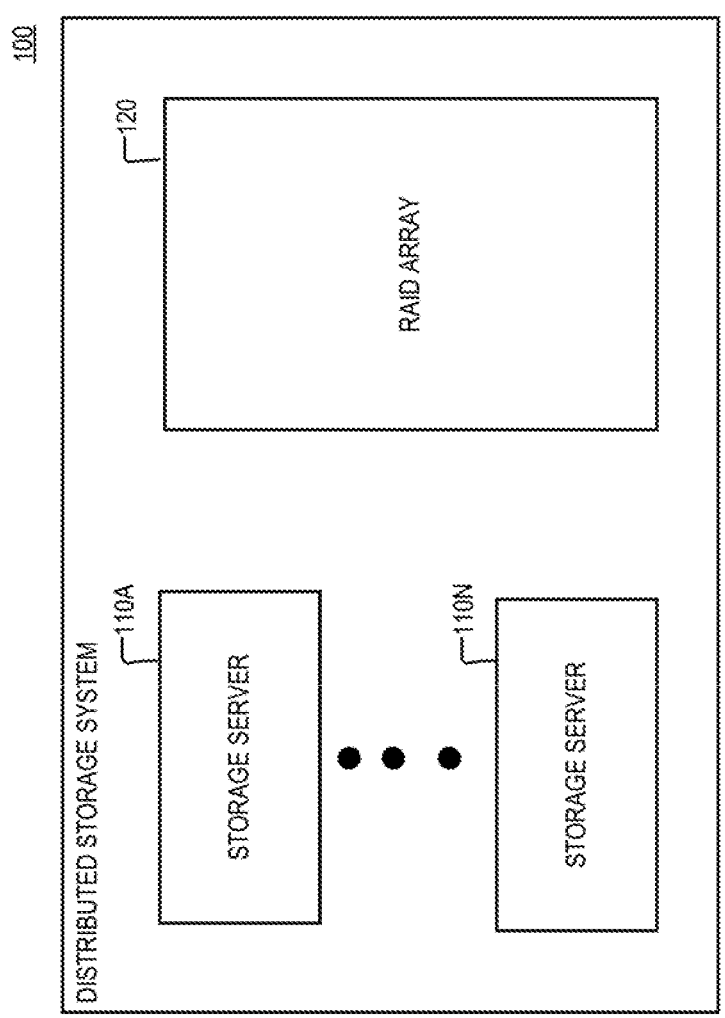
FIG. 1 is a diagram of an example of a storage system, according to aspects of the disclosure.

FIG. 1 is a diagram of an example of a storage system 100, according to aspects of the disclosure. As illustrated, the storage system 100 may include one or more storage servers 110 and a RAID array 120. The RAID array 120 may include a RAID 6 array and/or another type of RAID array. According to the present example, the storage system 100 is a content-addressable storage system. However, alternative implementations are possible in which the storage system 100 includes any other suitable type of storage system, such as a location-addressed storage system. Stated succinctly, the present disclosure is not limited to any specific type of storage system.

Figure 2:
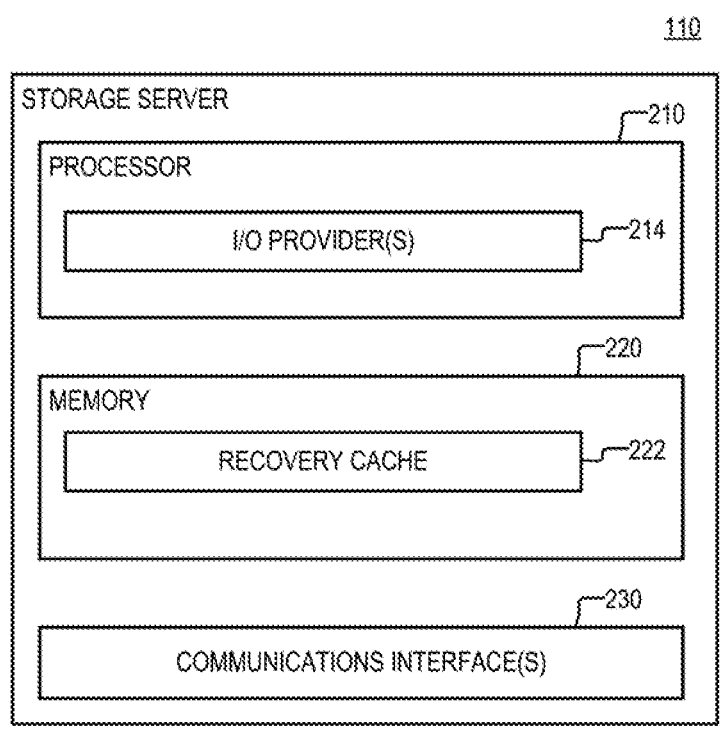
FIG. 2 is a diagram of an example of a storage server, according to aspects of the disclosure.

FIG. 2 is a diagram of an example of a storage server 110, according to aspects of the disclosure. The storage server 110, as the numbering suggests, is representative of any of the storage servers 110-1 through 110-N in the storage system 100. As illustrated, the storage server 110 may include a processor 210, a memory 220, a communications interface(s) 230. The processor 210 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 220 may include any suitable type of volatile and/or non-volatile memory. In some implementations, the memory 220 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 230 may include any suitable type of communications interface, such as one or more Ethernet adapters, one or more Wi-Fi adapters (e.g., 802.1414 adapters), and one or more Long-Term Evolution (LTE) adapters, for example.

According to the present example, the processor 210 may be configured to execute at least I/O provider(s) 214. The I/O provider(s) 214 may include one or more processes for executing incoming I/O requests (e.g., write requests). Although in the present example the I/O provider(s) 214 are implemented in software, alternative implementations are possible in which the I/O provider(s) 214 are implemented in hardware or as a combination of hardware and software. Stated succinctly, the present disclosure is not limited to any specific implementation of the I/O provider. As used throughout the disclosure, the term "I/O provider" may refer to one or more processes which, alone or in combination with other processes, are configured to execute I/O requests that are received at the storage system 100, such as write requests for example. The I/O provider(s) 214 are discussed further below with respect to FIG. 3.

According to the present example, the memory 220 may be configured to store a recovery cache 222. The recovery cache 222 may include one or more data structures where recovered data blocks are stored following a failure of one or more devices in the RAID array 120. As used throughout the disclosure, the phrase "recovery of a data block" and its inflected form shall refer to calculating at least a portion of the data block based on parity data that is available in RAID array 120 (or elsewhere) and/or the contents of other data blocks in the RAID array 120 that are located in storage devices that remain operational.

In some implementations, the recovery cache 222 may be stored only in volatile memory of the storage system 100 (e.g., only in the random-access memory of one or more nodes of the storage system 100). However, alternative implementations are possible in which at least a portion of the recovery cache 222 is stored in a non-volatile memory of one or more nodes in the storage system 100. Although FIG. 2 depicts the recovery cache 222 as being stored entirely the memory of a single server, it will be understood that alternative implementations are possible in which the contents of the recovery cache is distributed across a plurality of nodes in the storage system 100. Although FIG. 2 depicts the recovery cache 222 as being stored on a storage server, it will be understood that alternative implementations are possible in which at least a portion of the recovery cache 222 is stored in the memory of another type of node of the storage system 100, such as a system manager (not shown).

In some implementations, the recovery cache 222 may be instantiated in response to detecting a failure of one or more storage devices in the RAID array 120. Additionally or alternatively, in some implementations, the recovery cache 222 may be instantiated when the storage system 100 is started. Additionally or alternatively, in some implementations, the recovery cache 222 may be discarded once the RAID array 120 is rebuilt. In some implementations, rebuilding the RAID array 120, after one or more storage devices have failed, may include: (i) recovering all valid data blocks that are stored on the failed storage devices, (ii) storing the recovered data blocks on storage devices, in the RAID array 120, that remain operational, (iii) updating the metadata of the storage system in accordance with the new locations of the recovered data blocks, and (iv) and updating metadata of the storage system 100 to identify the new locations where the recovered data blocks are stored.

Figure 3:
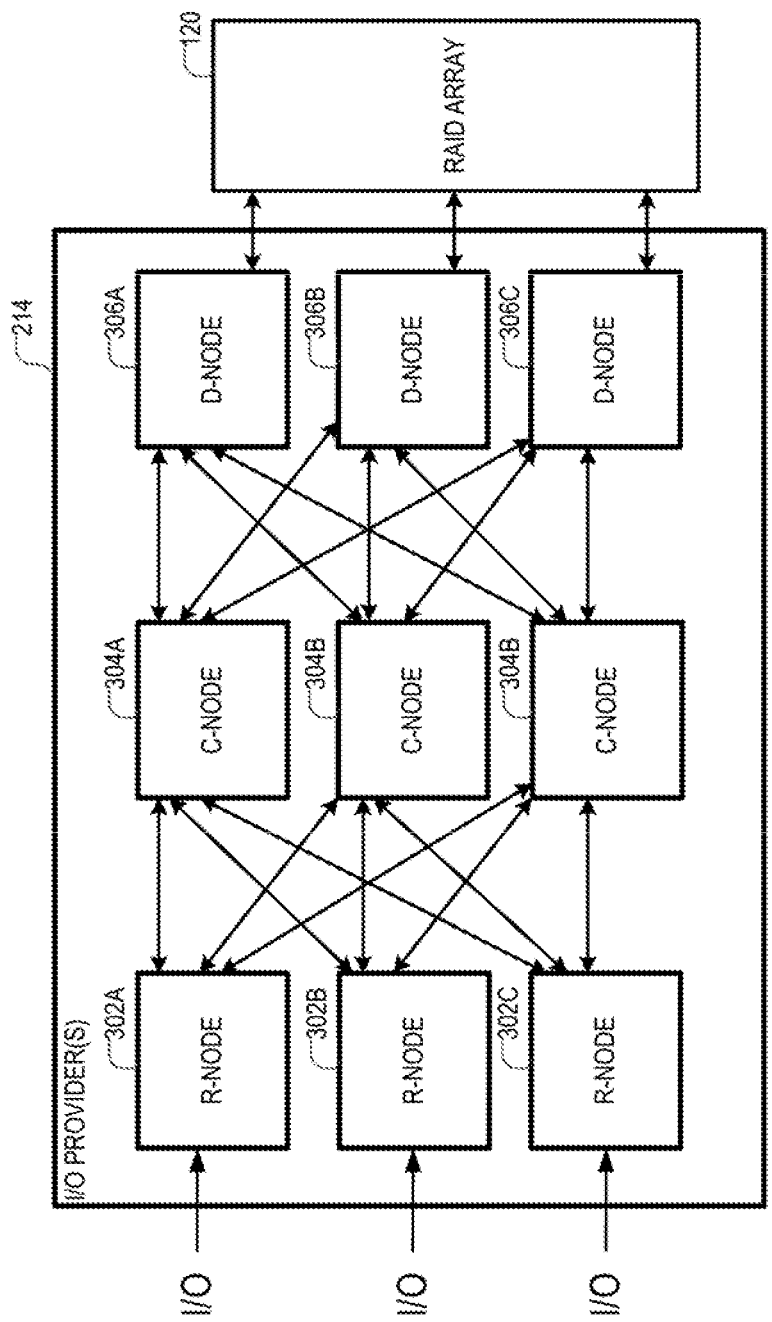
FIG. 3 is a diagram of an example of an I/O provider that is executed by the storage server of FIG. 2, according to aspects of the disclosure.

FIG. 3 is a diagram illustrating an example of one implementation of the I/O provider(s) 214. According to the present example, the I/O provider(s) 214 includes I/O providers 302, 304, and 306, which are herein referred to as routing nodes (R-nodes), control nodes (C-nodes), and data nodes (D-nodes) respectively. The R-nodes, the C-nodes, and the D-nodes are connected to one another in a mesh network. According to the present example, the R-nodes, the C-nodes, and the D-nodes are part of the same I/O provider, and as such, they are executed on the same storage server. However, it will be understood that alternative implementations are possible in which at least some of the R-nodes, the C-nodes, and the D-nodes are executed on different storage servers and/or are part of different I/O providers.

The R-nodes 302 may be configured to terminate I/O requests received at the storage system 100 and route them to appropriate C-nodes 304 and D-nodes 306 for further execution. In doing so, the R-nodes 302 may distribute a workload over multiple C-nodes 304 and D-nodes 306. In some implementations, any of the R-nodes 302 may be configured to write I/O requests (e.g., SCSI I/O requests) to selected ones of the C-nodes 304 for further processing.

The C-nodes 304 may be configured to control the execution of C-node commands supplied by the R-nodes 302. The C-node commands may be used to implement read requests, write requests, and/or any other suitable type of I/O request. In addition, each of the C-nodes 304 may maintain and manage key metadata elements. Each of the C-nodes 304 may be configured to receive C-node commands from the R-nodes and communicate with the D-nodes 306 to execute the commands.

The D-nodes 306 may be configured to control the execution of D-node commands supplied by the C-nodes 304 by reading and/or writing data to the RAID array 120. Each of the D-nodes 306 may be configured to map hash digests received from the C-nodes (in respective D-node commands) to different physical locations in the RAID array 120. In some implementations, the mapping may be performed by using a hash-to-physical address (MP) structure (not shown) that is stored in the memory of any of the D-nodes 306.

In operation, any of the R-nodes 302 may receive an I/O request that spans a range of logical data addresses (LDAs) from a multipath agent. The request may include a block of data and an opcode identifying an action that is required to be performed. In response to the request, the R-node 302 may identify a plurality of C-nodes 304. Afterwards, the R-node 302 may decompose the I/O request into a plurality of C-node commands and forward the C-node commands to the identified C-nodes 304 for further processing.

In operation, any of the C-nodes 304 may receive a C-node command that is generated by one of the R-nodes 302. Upon receiving the C-node command, the C-node 304 may generate one or more D-node commands and supply the generated D-node commands to corresponding D-nodes 306 for further processing. In some implementations, any of the D-node commands may include a command to retrieve or store data in the RAID array 120. In such implementations, the D-node command may include either desired to be stored in the RAID array 120 or a hash digest of data that is desired to be retrieved from the RAID array 120.

In operation, any of the D-nodes 306 may receive a D-node command that is generated by one of the C-nodes 304. Next, the D-node 306 may identify a physical address in the RAID array 120 that corresponds to a hash digest that is contained in the D-node command. Afterwards, the D-node 306 may either store a payload of the D-node command (i.e., a block of data contained in the D-node command) at the identified physical address or retrieve, from the RAID array 120, a data block that is stored at the identified address.

Figure 4A:
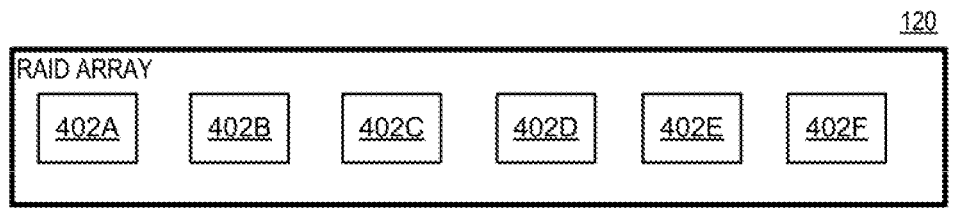
FIG. 4A is a diagram illustrating a physical configuration of a Redundant Array of Independent Disks (RAID) array, according to aspects of the disclosure.

FIG. 4A is a diagram showing a physical arrangement of the RAID array 120, according to aspects of the disclosure. As illustrated, the RAID array 120 may include a plurality of storage devices 402 (e.g., storage devices 402A-402F) that are arranged to operate in a RAID 6 configuration. According to the example of FIG. 4, storage devices 402A-D are used to store user data, and storage devices 402E-F are used to store parity data for recovering the user data when any of the storage devices 402A-402D fails. In the example of FIG. 4, the RAID array 120 utilizes double distributed parity, which permits the recovery of data when up to two of the storage devices 402A-402D fail at the same time. However, alternative implementations are possible in which the RAID array 120 provides single distributed parity. In any event, it will be understood that the RAID array 120 is not limited to any specific data encoding scheme. According to the present example, each of the storage devices 402 includes a solid-state drive (SSD). However, alternative implementations are possible in which any of the storage devices 402 includes another type of storage device, such as a hard disk (HD) or a non-volatile random-access memory (nvRAM) device. Stated succinctly, the present disclosure is not limited to any specific type of storage device being used in the RAH) array 120. Although the RAH) array 120 is depicted as including only 6 storage devices, it will be understood that the RAID array 120 may include any suitable number of storage devices. For example, in some implementations, the RAID array 120 may include anywhere between 18 and 35 storage devices.

Figure 4B:
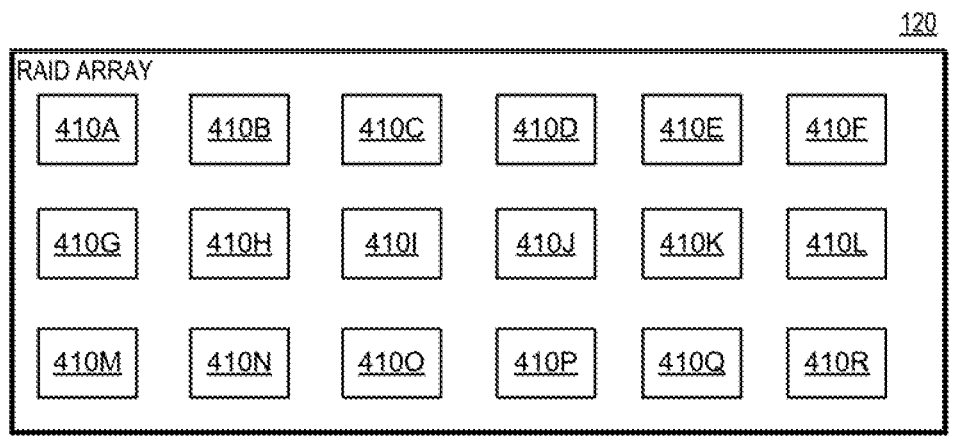
FIG. 4B is a diagram illustrating a logical configuration of the RAID array of FIG. 4A, according to aspects of the disclosure.

FIG. 4B is a diagram showing a logical arrangement of the RAID array 120, according to aspects of the disclosure. In some implementations, the RAID array 120 may be arranged in a striped configuration, in which data is stored in a plurality of stripes 410A-R. Data striping is a technique of segmenting data, so that consecutive data segments are stored on different physical storage devices. Although FIG. 4B shows the RAID array 120 as having 15 stripes, it will be understood that in practice the RAID array 120 may have thousands and even hundreds of thousands of stripes.

Figure 5:
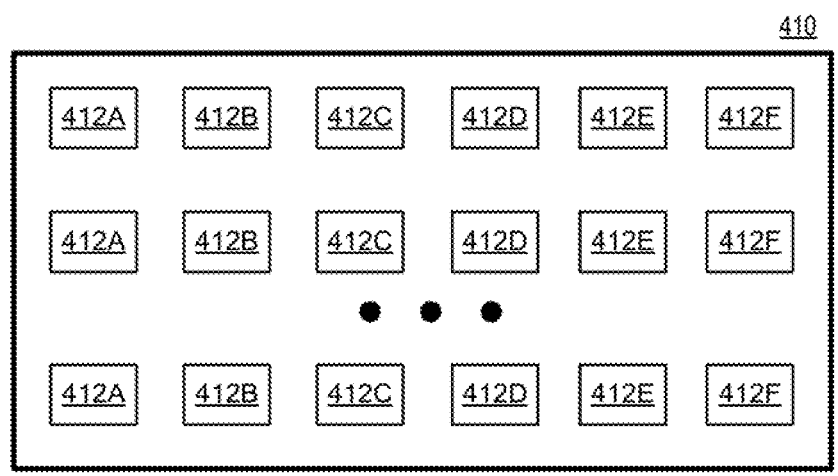
FIG. 5 is a diagram of a RAID stripe, according to aspects of the disclosure.

FIG. 5 shows an example of a stripe 410 that is stored in the RAID array. As the numbering suggests, the stripe 410 may be the same or similar to any of the stripes 410A-R, which are shown in FIG. 4B. As illustrated, the stripe 410 includes a plurality of data blocks 412 that are stored on different ones of the storage devices 402. According to the present example, data blocks 412A are stored on the storage device 402A; data blocks 412B are stored on the storage device 402B; data blocks 412C are stored on the storage device 402C; data blocks 412D are stored on the storage device 402D; data blocks 412E are stored on the storage device 402E; and data blocks 412F are stored on the storage device 402F. Data blocks 412A-412D may contain user data and data blocks 412E-F may contain parity data for recovering the user data. When the storage device 402A, and/or another one of the storage devices 402A-D fails, the parity data stored in data blocks 412E-F can be used to recover the user data in a well-known fashion.

An example is now provided in which the storage device 402A fails while storage devices 402B-F remain operational. When the storage device 402A fails, at least some of the valid data blocks 410A that are stored on the storage device 402A can no longer be retrieved from the storage device 402A. Accordingly, the RAID array needs to be rebuilt by recovering all valid data blocks that were stored on the storage device 402A at the time the storage device 402A failed. As noted above, the recovery of the valid data blocks may be carried out based on parity data that is stored on the storage devices 402E-F and/or user data that is stored on the storage devices 402B-D. It will be understood that the present disclosure is not limited to any specific method for encoding parity data, and/or performing recovery of data blocks based on the parity data. Although in the present example only one device fails, it will be understood that the principles and techniques described in the present disclosure can be applied when multiple devices in the RAID array fail, provided that the data encoding scheme used by the RAID array permits data recovery.

According to the present disclosure, the recovery of data blocks that were stored on a failed device can be carried out by two separate processes, which are herein referred to as a "foreground" process and a "background" process. The foreground process is executed as part of the servicing of read commands. When a read command is received that requests the retrieval of a data block that is stored on a failed storage device, the data block can be calculated immediately (e.g., out of sequence) and returned in response to the read command. By contrast, the background process may recover data blocks in the background (e.g., in sequence) without there being specific read commands for the data blocks.

Recovering data blocks that were stored on a failed storage device can be computationally intensive (especially when multiple storage devices have failed). The background and foreground process can be executed in parallel with one another. Executing the background and foreground parallel can result in the same data block being recovered twice— i.e., once by the background process and once by the foreground process. Calculating the same data block twice would result in a waste of computing resources. To prevent the same data block from being calculated twice, the recovery cache 222 can be used. According to aspects of the disclosure, when one of the background process and the foreground process calculates a given data block, the recovered data block is stored in the recovery cache. When the time comes for the other one of the background process and the foreground process to calculate (i.e., recover) the same data block, the background process or the foreground process may check the recovery cache to see if the data block has been recovered already. If the data block has been recovered already, the process retrieves the data block from the recovery cache 222. On the other hand, if the data block has not been recovered yet, the process calculates the data block and stores it in the recovery cache. Under this arrangement, the recovery of each of the valid data blocks on the failed storage device 402A may be carried out once only.

When the storage device 402A fails, not all data black that are allocated to the storage device 402A need to be recovered—rather, only valid data blocks that are stored on the failed storage device 402A need to be recovered. According to the present disclosure, a valid data block may include a data block that is expected to be retrievable from the storage device 402A. By the same token, an invalid data block may be a data block that is not expected to be retrievable from the storage device 402A. For instance, an invalid data block may include a data block that has been marked as dirty, a data block that is not referenced in any metadata tables e.g., an H2P table) of the storage system 100, a data block that is used to store temporary data that is no longer used, a data block that can be overwritten, and/or any other data block that is not considered to be currently in use to store user data.

When a valid data block is recovered and stored in the recovery cache 222, the stripe 410, which the data block is part of is said to be represented in the recovery cache 222. When the RAID array 120 is rebuilt, after the failure of one or more storage devices 402, any data blocks that have been stored in the recovery cache 222 are removed from the recovery cache 222, and the data block's respective stripes are no longer represented in the recovery cache 222. When a stripe is represented in the recovery cache 222, garbage collection, defragmentation, and/or other services may be suspended in order to maintain the storage system 100 in a consistent state. When a stripe stops being represented in the recovery cache 222, garbage collection, defragmentation, and/or other services that have been suspended for that stripe may again be enabled. In general, the rebuilding of the RAID array 120, in addition to data recovery, may also require various secondary tasks to be performed that are necessary for maintaining the storage system 100 in a consistent state, such as recalculating parity data, updating one or more metadata tables in the storage system, etc. In this regard, the suspension of garbage collection and other services for stripes that are represented in the recovery cache may be permitted the secondary tasks to be performed in an orderly fashion, without errors.

In some instances, when one or more storage devices 402 fail, one or more stripes in the RAID array 120 may have no valid data blocks that are stored on the failed storage devices 402. For any such stripe, no recovery operations need to be performed (i.e., invalid data need not be recovered). According to the present disclosure, when one or more storage devices in a storage system fail, any stripe that contains no valid data blocks on any of the failed storage devices is herein referred to as a "type-1" stripe. Furthermore, any stripe that contains a valid block that is stored on at least one of the failed storage devices, but which is not represented in the recovery cache 222, is herein referred to as a type-2 stripe.

According to the aspects of the disclosure, type-1 and type-2 stripes may be given priority with respect to the execution of write commands when one or more of the storage devices 402 fail and before the RAID array 120 is rebuild. Specifically, when a write command is received by a node in the storage system 100, the node may store any data block that is associated with the write command in a type-1 stripe, whenever a type-1 is available to receive the data block. If no such type-1 stripe is available, however, the node may store the data block in a type-2 stripe, provided that a type-2 stripe is available to receive the data block. When neither a type-1 stripe or a type-2 stripe is available to receive the data block, the node may handle the write command by using any other suitable mechanism for handling write commands when a storage device in a RAID array has failed (and/or while the RAID array is being rebuilt), such mechanisms may include letting the write command to time out, generating an error, storing data associated with the write command in a temporary memory until the RAID array 120 is rebuilt, etc.

Figure 6:
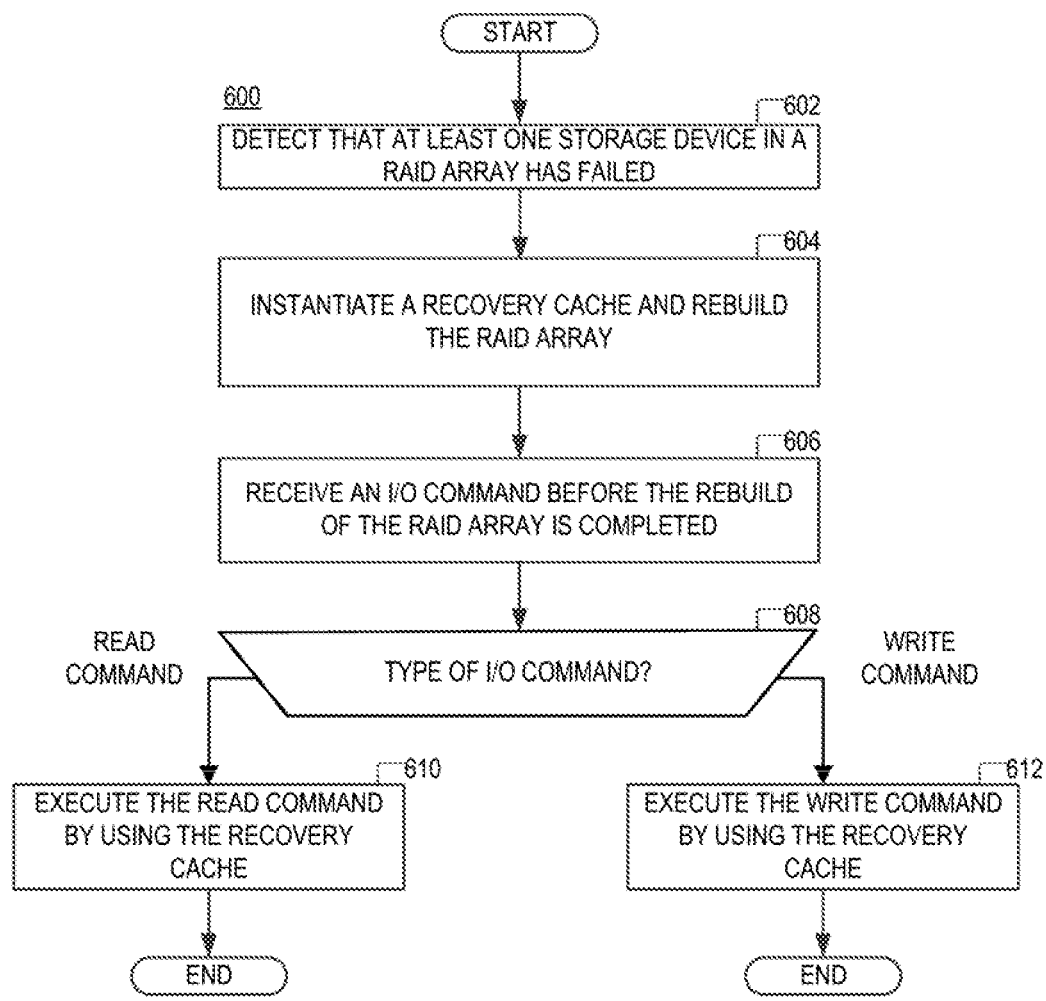
FIG. 6 is a flowchart of an example of a process, according to aspects of the disclosure.

FIG. 6 is a flowchart of an example of a process 600 for executing I/O commands, according to aspects of the disclosure. At step 602, a storage system detects that a storage device in a RAID array has failed. In some implementations, the RAID array may be the same or similar to the RAID array 120, which is discussed above with respect to FIG. 1. At step 604, the storage system instantiates a recovery cache and rebuilds the RAID array. In some implementations, the recovery cache may be the same or similar to the recovery cache 222, which is discussed above with respect to FIG. 4. In some implementations, the rebuilding of the RAID array 120 may be performed in accordance with a process 900, which is discussed further below with respect to FIG. 9. At step 606, the storage system obtains an I/O command. At step 608, the storage system determines the type of the I/O command. If the I/O command is a read command, the process 600 proceeds to step 610. Otherwise, if the I/O command is a write command, the process 600 proceeds to step 612. At step 610, the storage system executes I/O command in accordance with a process 700, which is discussed further below with respect to FIG. 7. At step 612, the I/O command is executed in accordance with a process 800, which is discussed further below with respect to FIG. 8.

Figure 7:
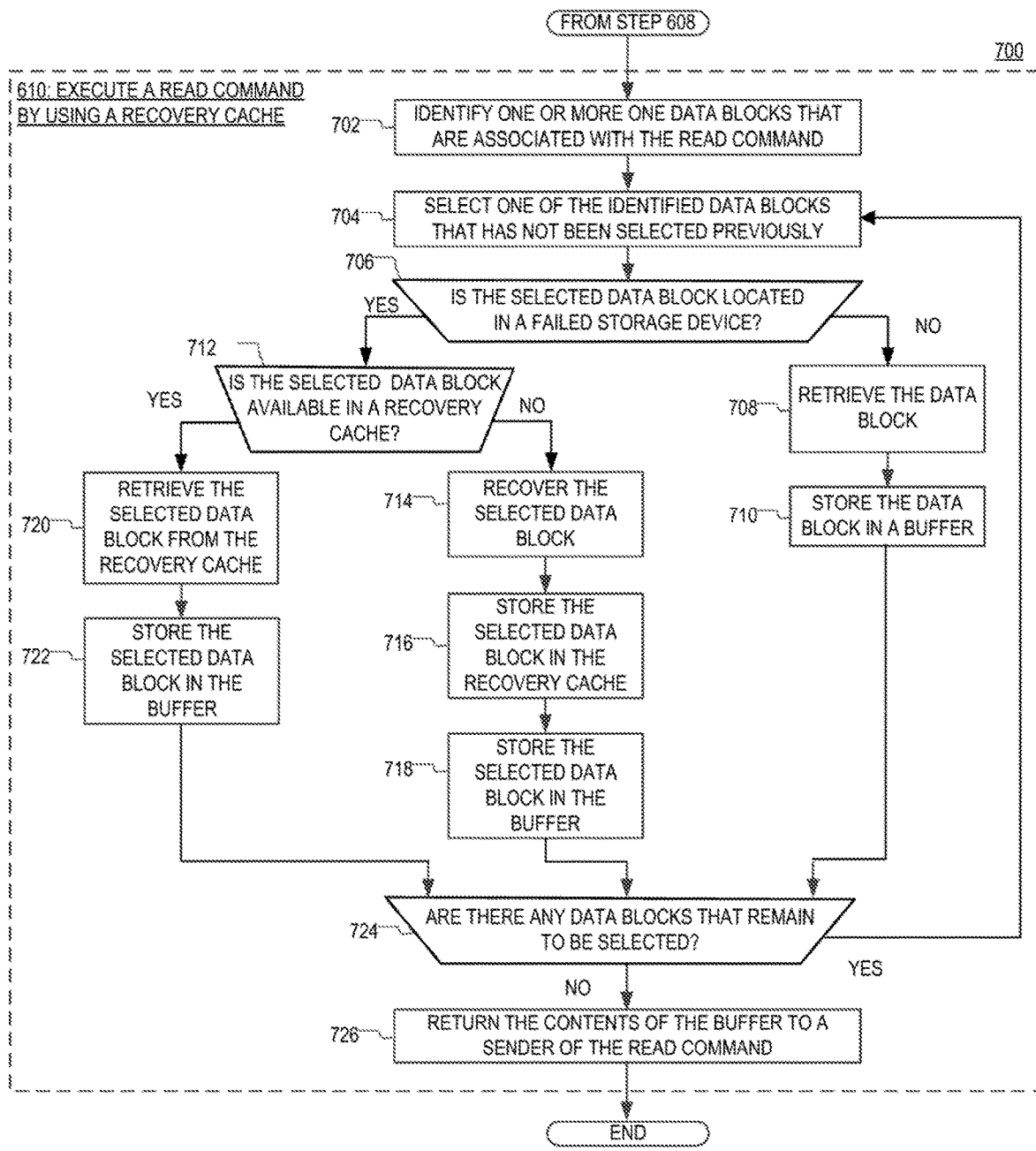
FIG. 7 is a flowchart of an example of a process, according to aspects of the disclosure.

FIG. 7 is a flowchart of a process 700 for executing a read command, as specified by step 610 of the process 600, according to aspects of the disclosure.

At step 702, the storage system identifies one or more data blocks that are associated with the read command. At step 704, the storage system selects one of the identified data blocks, which has not been selected earlier during the same execution of the process 700. In other words, according to the example of FIG. 7, each of the data blocks is selected once during different iterations of steps 704-724 (which are performed before the process 700 ends). At step 706, the storage system detects whether the selected data block is located in any of the storage devices whose failure is detected at step 602. If the selected data block is not located in any failed storage devices, the process 700 proceeds to step 708. Otherwise, if the selected data block is located in any of the storage devices whose failure is detected, the process 700 proceeds to step 712.

At step 708, the storage system retrieves the data block from one of the storage devices in the RAID array that are still operational. At step 710, the storage system stores the data block in a buffer. The buffer may include any suitable memory location where data blocks are collected before being returned in response to the read request.

At step 712, the storage system detects whether the selected data block is available (e.g., stored) in the recovery cache. As noted above, step 712 is executed when the selected data block is located on a failed storage device and it needs to be recovered because it cannot be retrieved from the failed storage device. As is discussed further below, the selected data block would be stored in the recovery cache if the selected data block has already been recovered (e.g., during the execution of another read operation). On the other hand, if the selected data block has not been recovered yet, the selected data block would not be available in the recovery cache. If the selected data block is available in the recovery cache, the process 700 proceeds to step 714. Otherwise, if the selected data block is not available in the recovery cache, the process 700 proceeds to step 720.

At step 714, the storage system recovers the selected data block. In some implementations, the selected data block may be recovered based on parity data that is stored on storage devices in the storage array that remain operational and/or user data that is stored in the operational storage devices. At step 716, the storage system stores the selected data block in the recovery cache. At step 718, the selected data block is stored also the buffer.

At step 720, the storage system retrieves the selected data block from the recovery cache. At step 722, the selected data block is stored in the buffer.

At step 724, the storage node detects if all of the data blocks (identified at step 702) have been selected already during the execution of the process 700. If all of the data blocks have been selected, the process 700 proceeds to step 726. Otherwise, the process 700 returns to step 704, and another data block is selected. At step 726, the data blocks that have been stored in the buffer to a source of the read command.

Figure 8:
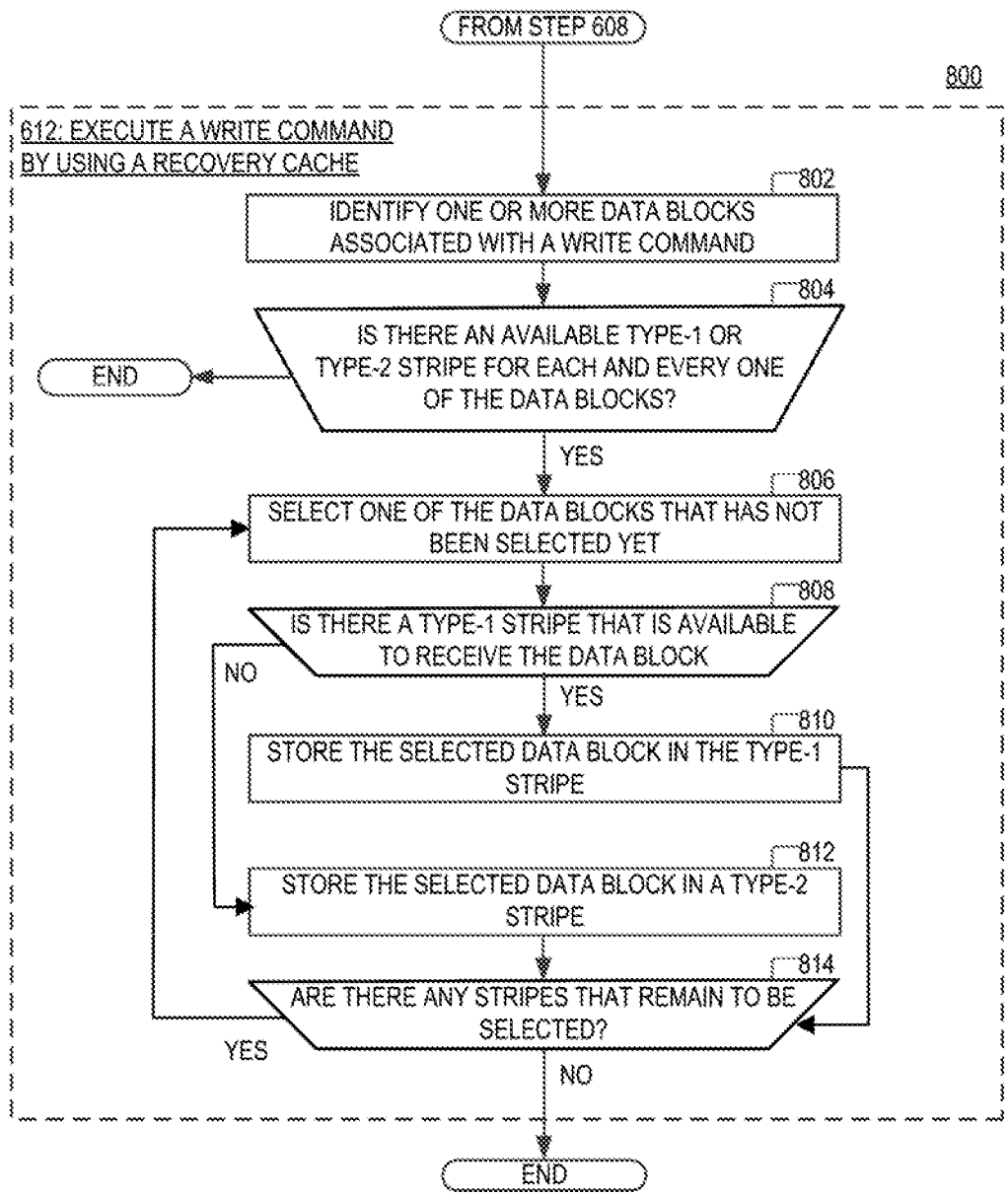
FIG. 8 is a flowchart of an example of a process, according to aspects of the disclosure.

FIG. 8 is a flowchart of a process 800 for executing a write command, at specified by step 612 of the process 600, according to aspects of the disclosure. At step 802, the storage system identifies one or more data blocks that are associated with the write command. At step 804, the storage node detects whether there is an available type-1 or type-2 stripe in the storage array for each of the stripes in the storage array. If there is an available type-1 or type-2 stripe for each of the data blocks (identified at step 802), the process 800 proceeds to step 806. Otherwise the process 800 ends. At step 806, the storage node selects one of the data blocks that has not been selected during the same execution of the process 800. At step 808, the storage node detects whether there is an available type-1 stripe that can receive the data block. At step 810, the selected data block is stored in the identified type-1 stripe. At step 812, the selected data block is stored in a type-2 stripe that is available to receive the data block. At step 814, a determination is made each of the data block (identified at step 802) has already been selected once (at step 806). If there are data blocks that remain to be selected, the process 800 returns to step 806. Otherwise, if all data blocks have been selected, the process 800 ends. As can be readily appreciated, each of the data blocks (identified at step 802) can be selected only once (at step 806) during the execution of the process 800.

Figure 9:
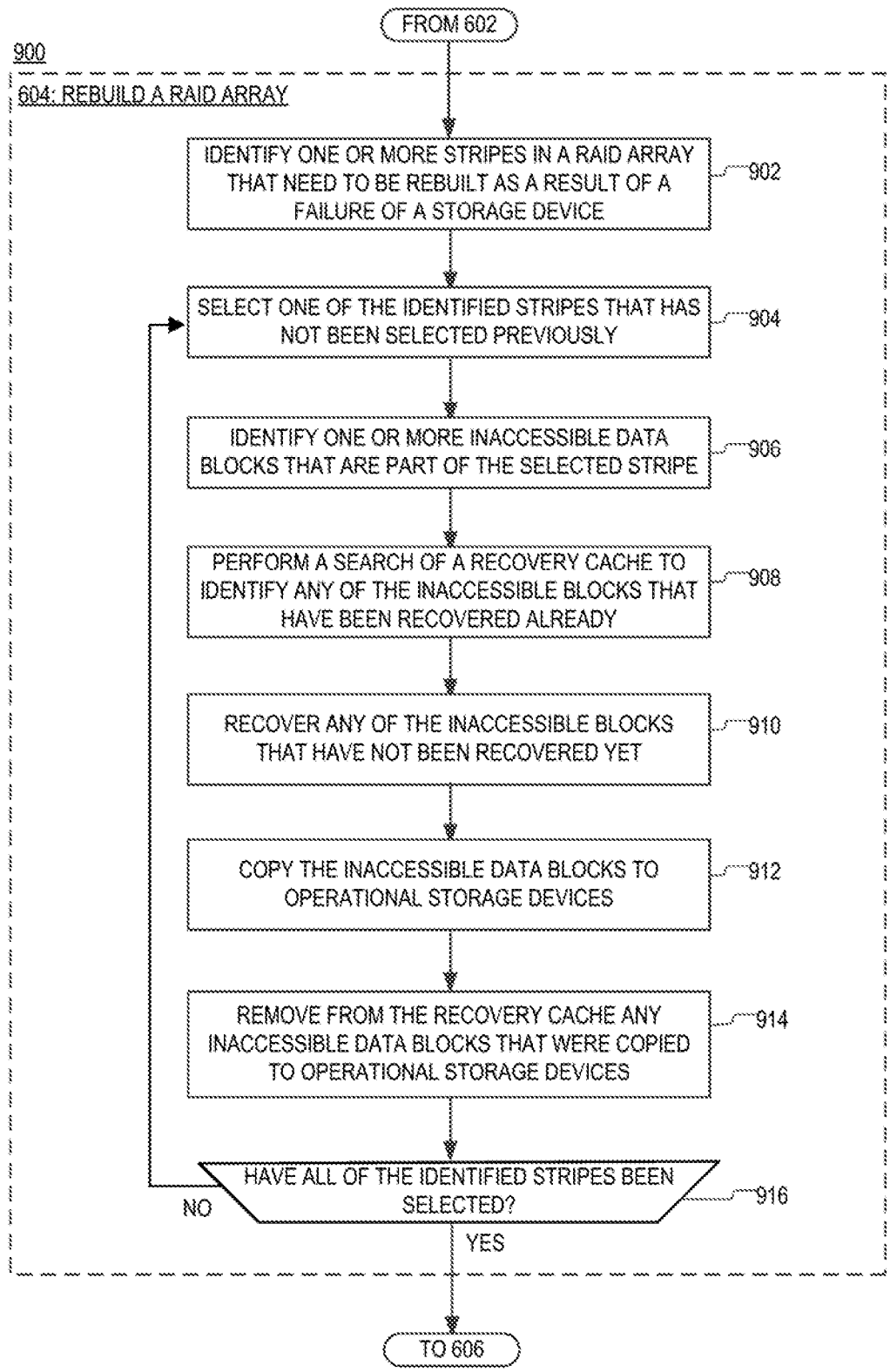
FIG. 9 is a flowchart of an example of a process, according to aspects of the disclosure.

FIG. 9 is a flowchart of an example of a process 900 for rebuilding a storage array as specified by step 604 of the process 600. At step 902, the storage node identifies one or more stripes in the RAID array that need to be rebuilt. At step 904, the storage node selects one of the identified stripes that has not been selected previously. At step 906, the storage node identifies one or more inaccessible data blocks that are part of the selected stripe. According to the present example, each of the inaccessible data blocks includes a data block that is stored on any of the failed storage devices (identified at step 602), and which cannot be retrieved without performing a data block recovery operation, which might involve calculating the block based on parity data. At step 908, the storage node performs a search of the recovery cache to identify any of the inaccessible data blocks in the selected stripe that have been recovered already. At step 910: (i) all of the inaccessible data blocks in the selected stripe that have not been recovered already (and which are not stored in the recovery cache) are recovered by the storage node, while (ii) no additional recovery operations are carried out (by the storage node) for inaccessible data blocks that have been previously recovered (and which are stored in the recovery cache). At step 912, the recovered inaccessible data blocks (i.e., the data block blocks that have been recovered earlier and stored in the recovery cache, as well as the data blocks recovered at step 910) are copied to storage devices in the RAID array that are operational. At step 914, the storage node removes from the recovery cache all (or at least some) of the inaccessible data blocks that were copied to operational storage devices (at step 912). In some implementations, the removed data blocks may include data blocks from the stripe (selected at step 904), which have been recovered earlier and stored in the recovery cache prior to the execution of the process 900 (i.e., the data blocks identified at step 908). At step 916, the storage node determines if each of the stripes has already been selected during the current execution of the process 900. If there are stripes that remain to be selected, the process 900 returns to step 904. Otherwise, if all stripes have been selected, the process 900 to step 916. According to the example of FIG. 9, each of the stripes (identified at step 902) can be selected only once (at step 904) during the execution of the process 900.

As can be readily appreciated, the process 600 is advantageous because, in practice, steps 604, 608, and 610 may be performed concurrently. For instance, data recovery that is performed at step 604 may be performed by a background process, which can be paused when an I/O command is received by the computing device executing the process 600, which requires execution of one of steps 608 and 610. The background process may be subsequently resumed after the I/O command is executed. As noted above, the use of a recovery cache, as discussed with respect to FIGS. 7-9, may help prevent the same data from being recovered multiple times, which in turn increases the efficiency of the storage system 100.

According to the present example, processes 600-900 are executed by one or more C-nodes of the storage system, such as the C-nodes 306, which are discussed above with respect to FIG. 3. However, alternative implementations are possible in which the processes 600-900 are executed by any other node (e.g., process, thread, computing device, etc.) of the storage system 100. Although processed 600-900 are presented in the context of content-addressable storage (CAS), it will be understood that the present disclosure is not limited to CAS systems only, and that processes 600-900 may be performed in any suitable type of computing system that utilizes a redundant storage array, such as a RAID array. Although processes 600-900 are presented in the context of RAID, it will be understood that they are not limited to being used on RAD only. It will be understood that process 600-900 can be performed in any suitable type of storage device array that implements redundant data storage, such as redundant data storage that is based on parity data. As used throughout the disclosure, the term "I/O command" may refer to an I/O request that is received at a storage system from an external device or a command that is generated internally within the storage system as part of servicing the I/O request. In the latter case, an example of an I/O command may be a C-node command.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface," "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims. (final)

The invention claimed is:
1. A method for use in a storage system, comprising:
detecting that at least one storage device in a redundant storage device array has failed, the redundant storage device array including a plurality of storage devices;
storing, in a memory, a recovery cache containing recovered data blocks, the recovered data blocks containing data previously stored on the failed storage device that has been calculated as part of executing read commands before the redundant storage device array is rebuilt;
receiving an I/O command that is associated with the redundant storage device array, the I/O command including one of a read command or a write command;
executing the I/O command by using the recovery cache; and
rebuilding the redundant storage device array by using the recovery cache, the rebuilding including; identifying one or more data blocks that are stored on the failed storage device performing one or more searches of the recovery cache to detect whether any of the identified data blocks has already been recovered; if not all of the identified data blocks have been recovered yet, recovering, based on parity data, each of the identified data blocks that has not been recovered yet, and copying the identified data blocks to the plurality of storage devices that remain operational, wherein the redundant storage device array includes a plurality of storage regions, and
wherein any of the storage regions includes a respective portion of each of the plurality of storage devices.

2. The method of claim 1, wherein the redundant storage device array includes a Redundant Array of Independent Disks 6 (RAID 6) array, and each of the plurality of storage regions includes a RAID 6 stripe.

3. The method of claim 1, wherein the recovery cache is used to ensure that any data block that is stored on the failed storage device is recovered at most once before the redundant storage device array is rebuilt.

4. The method of claim 3, wherein;
rebuilding the redundant storage device array further includes selecting one of the plurality of storage regions;
identifying the one or more data blocks includes identifying the one or more data blocks in the selected storage region; and
the parity data is stored in the selected storage region.

5. The method of claim 1, wherein the I/O command includes a read command, and executing the I/O command includes:
detecting whether a given data block associated with the read command is stored on the failed storage device or an operational storage device;
when the given data block is stored on an operational storage device, retrieving the given data block from the operational storage device;
when the given data block is stored on the failed storage device, detecting whether the given data block has already been recovered by performing a search of the recovery cache;
when the given data block has already been recovered, retrieving the given data block from the recovery cache; and
when the given data block has not been recovered yet, recovering the given data block, and storing the given data block in the recovery cache.

6. A method for use in a storage system, comprising;
detecting that at least one storage device in a redundant storage device array has failed, the redundant storage device array including a plurality of storage devices;
storing in a memory, a recovery cache containing data blocks, the recovered data blocks containing data previously stored on the failed storage device that has been calculated as part of executing read commands before the redundant storage device array is rebuilt;
receiving and I/O command that is associated with the redundant storage device array, the I/O command including one of a read command or a write command; and
executing the I/O command by using the recovery cache,
wherein the redundant storage device array incudes a plurality of storage regions,
wherein any of the storage regions includes a respective portion of each of the plurality of storage devices, and
wherein the I/O command includes a write command, and executing the I/O command includes: when a type-1 storage region is available in the redundant storage device array to receive a data block associated with the write command, storing the data block in the type-1 storage region, the type-1 storage region being a storage region that contains no blocks that need to be recovered; and when a type-1 storage region is not available in the redundant storage device array to receive the data block and a type-2 storage region is available to receive the data block, storing the data block in the type-2 storage region, the type-2 storage region being a storage region that contains no blocks that have been recovered and stored in the recovery cache.

7. The method of claim 6, wherein, when neither one of a type-1 storage region nor a type-2 storage region is available to receive the data block, executing the I/O command includes at least one of (i) allowing the write command to time out, (ii) generating an error indicating that the write command cannot be completed successfully, or (iii) storing the data block in a temporary storage location and generating an acknowledgement indicating that the write command has been completed successfully.

8. A system, comprising:
at least one processor that is configured to perform the operations of:
detecting that at least one storage device in a redundant storage device array has failed, the redundant storage device array including a plurality of storage devices;
storing, in a memory, a recovery cache containing recovered data blocks, the recovered data blocks containing data previously stored on the failed storage device that has been calculated as part of executing read commands before the redundant storage device array is rebuilt;
receiving an I/O command that is associated with the redundant storage device array, the I/O command including one of a read command or a write command;
executing the I/O command by using the recovery cache; and
rebuilding the redundant storage device array by using the recovery cache, the rebuilding including, identifying one or more data blocks that are stored on the failed storage device, performing one or more searches of the recovery cache to detect whether any of the identified data blocks has already been recovered; if not all of the identified data blocks have been recovered yet, recovering, based on parity data, each of the identified data blocks that has not been recovered yet, and copying the identified data blocks to the plurality of storage devices that remain operational,
wherein the redundant storage device array includes a plurality of storage regions,
wherein any of the storage regions includes a respective portion of each of the plurality of storage devices.

9. The system of claim 8, wherein the redundant storage device array includes a Redundant Array of Independent Disks 6 (RAID 6) array, and each of the plurality of storage regions includes a RAID 6 stripe.

10. The system of claim 8, wherein the recovery cache is used to ensure that any data block that is stored on the failed storage device is recovered at most once before the redundant storage device array is rebuilt.

11. The system of claim 10, wherein;
rebuilding the redundant storage device array further includes selecting one of the plurality of storage regions;
identifying the one or more data blocks includes identifying the one or more data blocks in the selected storage region; and
the parity data is stored in the selected storage region.

12. The system of claim 8, wherein the I/O command includes a read command, and executing the I/O command includes:

detecting whether a given data block associated with the read command is stored on the failed storage device or an operational storage device;

when the given data block is stored on an operational storage device, retrieving the given data block from the operational storage device;

when the given data block is stored on the failed storage device, detecting whether the given data block has already been recovered by performing a search of the recovery cache;

when the given data block has already been recovered, retrieving the given data block from the recovery cache; and when the given data block has not been recovered yet, recovering the given data block, and storing the given data block in the recovery cache.

13. A system comprising;

at least one processor that is configured to perform the operation of, detecting that at least one storage device in a redundant storage device array has failed, the redundant storage device array including a plurality of storage devices;

storing, in a memory, a recovery cache containing recovered data blocks, the recovered data blocks containing data previously stored on the failed storage device that has been calculated as part of executing read commands before the redundant storage device array is rebuilt;

receiving an I/O command that is associated with the redundant storage device array, the I/O command including one of a read command or a write command, and executing the I/O command by using the recovery cache, wherein the redundant storage device array includes a plurality of storage regions, wherein any of the storage regions includes a respective portion of each of the plurality of storage devices wherein the I/O command includes a write command, and executing the I/O command includes: when a type-1 storage region is available in the redundant storage device array to receive a data block associated with the write command, storing the data block in the type-1 storage region, the type-1 storage region being a storage region that contains no blocks that need to be recovered; and when a type-1 storage region is not available in the redundant storage device array to receive the data block and a type-2 storage region is available to receive the data block, storing the data block in the type-2 storage region, the type-2 storage region being a storage region that contains no blocks that have been recovered and stored in the recovery cache.

14. The system of claim 13, wherein, when neither one of a type-1 storage region nor a type-2 storage region is available to receive the data block, executing the I/O command includes at least one of (i) allowing the write command to time out, (ii) generating an error indicating that the write command cannot be completed successfully, or (iii) storing the data block in a temporary storage location and generating an acknowledgement indicating that the write command has been completed successfully.

* * * * *